United States Patent [19]

Hunter

[11] 3,903,157

[45] Sept. 2, 1975

[54] SULFONYL SEMICARBAZIDES

[75] Inventor: Byron A. Hunter, Woodbridge, Conn.

[73] Assignee: Uniroyal, Inc., New York, N.Y.

[22] Filed: Feb. 6, 1974

[21] Appl. No.: 440,222

[52] U.S. Cl. ................................................. 260/554
[51] Int. Cl.² ......................................... C07C 133/02
[58] Field of Search ..................................... 260/554

[56] References Cited
UNITED STATES PATENTS

| | | | |
|---|---|---|---|
| 3,102,115 | 8/1963 | Breuer et al. | 260/554 X |
| 3,152,176 | 10/1964 | Hunter | 260/554 |
| 3,235,519 | 2/1966 | Hunter | 260/554 X |
| 3,245,982 | 4/1966 | McManus | 260/554 X |
| 3,344,182 | 9/1967 | Amidon | 260/554 |
| 3,352,909 | 11/1967 | Sayigh et al. | 260/554 |
| 3,546,234 | 12/1970 | Fauland et al. | 260/554 X |

*Primary Examiner*—Daniel E. Wyman
*Assistant Examiner*—Thomas A. Waltz
*Attorney, Agent, or Firm*—James J. Long

[57] ABSTRACT

Organic sulfonyl semicarbazides are prepared by reacting a salt of a sulfinic acid with azodicarbonamide in the presence of water. E.g., reaction of sodium p-toluene sulfinate with azodicarbonamide in water yields p-toluene sulfonyl semicarbazide, useful as a blowing agent.

19 Claims, No Drawings

SULFONYL SEMICARBAZIDES

This invention relates to a novel process for manufacturing sulfonyl semicarbazide compounds.

The invention resides in the discovery that sulfinic acid compounds react smoothly with azodicarbonamide in the presence of water to produce sulfonyl semicarbazides, in excellent yield and in high purity. This process is illustrated by the following reaction scheme:

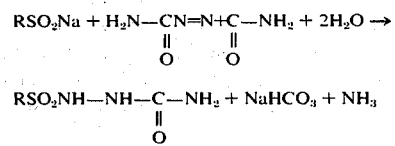

The preparation of sulfinic acids is well known and is described for example in Org. Collect. Vollect. Vol. IV p. 674.

In U.S. Pat. No. 3,235,519, Hunter, Feb. 15, 1966, there is described the use of sulfonyl semicarbazide compounds as blowing agents for manufacturing cellular polymeric materials. The methods used to prepare these compounds as described in the aforementioned patent are two:

1. Reaction of an organic sulfonyl hydrazide with cyanic acid (or a cyanic acid salt):

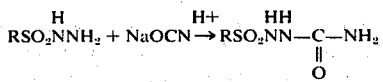

2. Reaction of an organic sulfonyl chloride with semicarbazide.

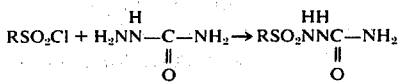

A variation of method (1) is to react an organic sulfonyl hydrazide with urea in accorance with the teaching in U.S. Patent 3,344,182, Amidon, September 26, 1969:

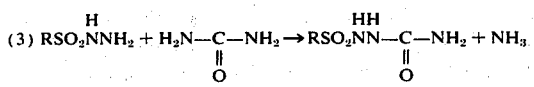

A problem with this latter process (3) as applied to the manufacture of p-toluene sulfonyl semicarbazide (a commercial high temperature blowing agent for plastics) is that impurities are also generated under the process conditions which tend to contaminate the material and produce a product having lowered decomposition temperature.

Limitations are also met in the process (1) described above which, in practial application, involves the reaction of p-toluene sulfonyl hydrazides with sodium cyanate in the presence of acid. In the process, part of the cyanate salt decomposes in the presence of acid to produce carbon dioxide and ammonia rather than cyanic acid. Consequently a very substantial excess of sodium cyanate is required to produce good yields of the desired sulfonyl semicarbazide. Although the product is generally prepared in higher purity than by process (3), the yield is less than desired.

Process (2) described in U.S. Pat. No. 3,152,176, Hunter, Oct. 6, 1964, involves the interaction of a sulfonyl chloride with semicarbazide. When applied to the preparation of p-toluene sulfonyl semicarbazide (see example B of cited patent) this process produces a relatively lower yield of crude product having a usually lower decomposition temperature than higher purity material. Further purification is required for obtaining a higher quality product.

It can be seen that the processes for preparing p-toluene sulfonyl semicarbazide described in the prior art are not entirely free of shortcomings, and an improved procedure is needed.

In accordance with the invention, it has now been discovered that interaction of salts of sulfinic acids with azodicarbonamide in the presence of water is an effective and efficient procedure for the synthesis of sulfonyl semicarbazides in high yield and high purity. The starting salts of sulfinic acids may be represented by the formula

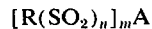

where R is an organic moiety, frequently a monovalent or divalent hydrocarbon radical such as an alkyl radical having from 1 to 18 carbon atoms, an alkylene radical having from 2 to 18 carbon atoms, an aryl or arylene radical having from 6 to 12 carbon atoms, an alkaryl or alkarylene radical having from 7 to 18 carbon atoms, an aralkyl or aralkylene radical having from 7 to 9 carbon atoms, a cycloalkyl or cycloalkylene radical having from 5 to 8 carbon atoms, or a group —R'—X—R"— where R' and R" are the same or different and are for example alkylene radicals having from 2 to 4 carbon atoms or phenylene, X is a connecting moiety such as —O—, —S—, —SO—, —SO$_2$—, —NH—, or —CO—, and the like, A is ammonium or a metal selected from lithium, sodium, potassium, magnesium, barium, calcium, zinc, cadmium and aluminum, $m$ is 1/2, 1 or 2, and n is 1 or 2. Furthermore, R, particularly when it is an aromatic moiety, may also carry substituents such as alkyl radicals of up to 20 carbon atoms, cyano, nitro, halogen (fluorine, chlorine, bromine and iodine), hydroxyl, or —COOR''' where R''' is hydrogen or alkyl of up to 13 carbon atoms for example. From such starting materials there are obtained, by reaction with azodicarbonamide in the presence of water in accordance with the invention, sulfonyl semicarbazides of the formula

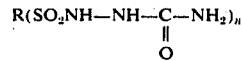

wherein R is as previously defined and $n$ is 1 or 2, depending on the valence of R.

Representative salts of sulfinic acids that may be used as starting materials for reaction with azodicarbonamide in the process of the invention include sodium benzenesulfinate, sodium toluenesulfinate, ammonium toluenesulfinate, potassium xylenesulfinate, lithium methanesulfinate, magnesium ethanesulfinate, calcium dipropanesulfinate, barium dibutanesulfinate, zinc dipentanesulfinate, ethylenebis (sodium sulfinate), propylenebis (potassium sulfinate), 1,4-butylenebis (ammonium sulfinate), 1,3-phenylenebis (sodium sulfinate), alpha, alpha'-xylylenebis (ammonium sulfinate), naphthalenebis (lithium sulfinate), 4,4'-bisphenylenebis (sodium sulfinate), p,p'-methylenebis (sodium benzenesulfinate), p,p'-isopropylidenebis (potassium benzenesulfinate), sodium cyclohexylsulfinate, calcium 1,4-cyclohexylenedisulfinate, p,p'-oxybis (sodium benzenesulfinate), p,p'-thiobis (potassium benzenesulfinate), p,p'-sulfinylbis (sodium benzenesulfinate), sulfonylbis (potassium toluenesulfinate), p,p'-iminobis (lithium benzenesulfinate), p,p'-carbonylbis (ammonium benzenesulfinate), etc.

Preferred products include those of the formula stated above wherein R is alkyl having 1 to 8 carbon atoms, alkylene having 2 to 8 carbon atoms, phenyl, phenyl substituted with 1 to 2 substituents selected from lower alkyl (1 to 4 carbon atoms) and halogen, biphenyl, naphthyl, phenylene (o-, m-, or p-), phenylene substituted with 1 or 2 substituents selected from lower alkyl (1 to 4 carbon atoms) and halogen, biphenylene, naphthylene, oxybisphenyl, thiobisphenyl, sulfinylbisphenyl, sulfonylbisphenyl, iminobisphenyl and carbonylbisphenyl (of the latter six bisphenyl types, oxybisphenyl is most preferred).

The starting salt of a sulfinic acid may be a water-soluble salt or a water-insoluble salt; generally the water-soluble salts are preferred.

To carry out the process, the sulfinic acid salt and azodicarbonamide are simply brought together in the aqueous medium, whereupon the reaction proceeds spontaneously. No heat is required, ordinary ambient or lower temperatures (e.g., 20°C. or lower) being satisfactory, but if desired elevated temperatures may be applied (e.g., 100°C.). The relative concentrations of the reactants are not critical; approximately stoichiometric proportions are ordinarily employed, but other proportions may be used. The reaction may be carried out under neutral or basic conditions, although essentially neutral conditions are almost invariably preferred. Usually recovery of the product is most efficient if, after the reaction is complete, the reaction mixture is slightly acidified.

The following examples will serve to illustrate the practice of the invention in more detail.

EXAMPLE I

Preparation of p-toluene sulfonyl semicarbazide

Charged a 1 liter flask with 35.6 g. sodium p-toluene sulfinate (anhydrous) (0.2 mole)
23.2 g. (0.2 mole) azodicarbonamide
800 ml. water The mixture was stirred. The color of the azodicarbonamide was discharged in 15 minutes as the temperature of the mix rose slightly (26° to 27°C.). The contents of the flask foamed slightly and developed a weakly alkaline reaction (pH paper). The mix was stirred without heating for a total of one hour and was then filtered, washed well with water and dried. Yield = 44.2 g. (98% of theory). Dec. 237°–238°C.

EXAMPLE II

Preparation of benzene sulfonyl semicarbazide

A 500 ml. flask equipped with a magnetic stirrer was charged with 16.4 g. (0.1 mole) of sodium benzene sulfinate, 11.6 g. (0.1 mole) of azodicarbonamide and 300 cc of water. The mixture was stirred at ambient temperature for one hour. The color of the azodicarbonamide disappeared and a white product was formed. The material was filtered off, washed with water and dried. There was obtained 20.0 g. of benzene sulfonyl semicarbazide which decomposed sharply at 225°C.

EXAMPLE III

Suspended 22.35 g. of barium p-toluene sulfinate (0.05 mole) and 11.6 g. azodicarbonamide (0.1 mole) in 200 ml water. Stirred for 1½ hours. The yellow color disappeared. The white solid was filtered off, washed well with water and dried at 60°C. Yield of p-toluene sulfonyl semicarbazide, 22.2 g. (98% of theory). MP. 237°C.

A portion of the filtrate when acidified with dilute hydrochloric acid produced bubbles of $CO_2$.

Addition of dilute sulfuric acid to a portion of the filtrate gave a heavy precipitate of barium sulfate.

EXAMPLE IV

Prepared a sample of potassium p-toluene sulfinate by adding 6.6 g of 85% potassium hydroxide to 15.6 g. (0.1 mole) of p-toluene sulfinic acid in 100cc water. Then 11.6 g (0.1 mole) of azodicarbonamide was added and the mixture stirred until the yellow color was completely discharged (1½ hours). Ammonia was detected in the space above the reaction mixture. The white solid was filtered off, washed with water and dried. Yield of p-toluene sulfonyl semicarbazide was 20.6 g. This melted with decomposition near 232°C. An additional half gram of the substance was obtained by acidification of the filtrate with dilute hydrochloric acid ($CO_2$ was produced also).

EXAMPLE V

Mixed 17.5 g. calcium p-toluene sulfinate (0.05 mole) and 11.6 g. azodicarbonamide (0.1 mole) in 200cc water. Stirred the mixture for ½ hour. The mixture thickened and the color soon disappeared. An addition of 150 cc more water was made. The colorless product was filtered, washed with water and dried. Yield of p-toluene sulfonyl semicarbazide was 21.5 g., MP 233°C. (dec).

EXAMPLE VI

A suspension of magnesium p-toluene sulfinate in water was prepared by adding a solution of 24.65 g. (0.1 mole) of $MgSO_4 \cdot 7H_2O$ in 200 cc water to a solution of 42.8 g. (0.2 mole) of sodium p-toluene sulfinate dihydrate in 500 cc water. The salt separated as the mix was stirred over five minutes. Then, 23.2 g. (0.2 mole) of azodicarbonamide was added to the suspension of the magnesium salt and 150 cc more of water was added. The color of the stirred mixture was discharged in ½ hour. The white solid was filtered off, washed with water and dried. Yield of p-toluene sulfonyl semicarbazide was 44.7 g. This melted with decomposition at 235°C.

EXAMPLE VII

Preparation of p-Toluene sulfonyl semicarbazide from p-toluene sulfonyl chloride Into a 3 liter beaker equipped with mechanical stirred, pH meter and thermometer was charged 126 g.

(1.0 mole) of sodium sulfite and 750 ml. water. The sodium sulfite dissolved. Then 190.6 g. (1.0 mole) of p-toluene sulfonyl chloride was added all at once. The pH started to drop and a solution of 80 g. (2.0 mole) of sodium hydroxide in 500 ml. of water was added at a rate to keep the pH between 7–8. Once the pH stabilized, it was allowed to rise to 10. This solution of sodium p-toluene sulfinate was used in the following manner:

A 4-liter beaker equipped with mechanical stirrer was charged with 1500 ml. of water and 116 g. (1.0 mole) of azodicarbonamide. The suspension of the yellow solid was stirred as the sodium p-toluene sulfite solution (1.0 mole) was added over a period of 10 minutes. The yellow color of the azodicarbonamide was discharged and a white product was formed. This was stirred for an additional ½ hour and was then filtered, washed well with water and dried at 60°C. Yield, 214 g. (93.4% of theory). The material decomposed at 240°C. and gave an infrared spectrum identical to an authentic sample of p-toluene sulfonyl semicarbazide. Analysis of the material gave the following:

|     | Calculated | Found |
| --- | --- | --- |
| % N | 18.34 | 18.24 |
| % S | 13.97 | 13.89 |
| % C | 41.92 | 42.01 |
| % H | 4.80 | 4.85 |

EXAMPLE VIII

Preparation of p-Toluene sulfonyl semicarbazide

Charged a 250 ml. flask with 21.6 g. sodium p-toluene sulfinate dihydrate (0.1 mole)
11.6 g. azodicarbonamide
50.0 cc conc. $NH_4OH$ The mixture was stirred. After a short time the mix thickened up and 100 cc of water was added, stirring was continued and the mixture gradually lost the yellow color of the azodicarbonamide and became white. Then dilute hydrochloric acid was carefully added. Considerable foaming occurred and the mix was removed to a 1,000 ml. beaker and the acidification was completed. The white precipitate was filtered off, washed well with water and dried. Yield, 22.6 g. (99%). The material decomposed when heated to 235°C.

EXAMPLE IX

Preparation of benzene sulfonyl semicarbazide

A beaker was charged with 17.37 g. (0.1 mole) of zinc benzene sulfinate and 50 cc conc. $NH_4OH$. The solid passed into solution. Then 11.6 g. (.05 mole) of azodicarbonamide and 100 cc of water were added. The mixture warmed up slightly as the yellow color gradually was discharged. After one hour of stirring the white product was filtered off, washed well with water and dried. Yield, 21.4 g. Dec. 225°–226°C.

Acidification of the filtrate produced $CO_2$ gas.

EXAMPLE X

Preparation of p,p'-Oxybis(benzene sulfonyl semicarbazide)

In a manner similar to that described in Example VII, ½ mole of p,p'-oxybis(sodium benzene sulfinate) was prepared by adding 183.5 g. (0.5 mole) of p,p'-oxybis(benzene sulfonyl chloride) to a solution of 126 g. (1.0 mole) of sodium sulfite in 750 ml. water and then adding a solution of 80 g. (2.0 mole) of NaOH in 500 ml. water at such rate as to keep the pH between 7–8. The final addition of NaOH brought the pH to 10.0. This solution was then added over 10 minutes to a stirred suspension of 116 g. (1.0 mole) of azodicarbonamide in 1,500 ml. water (a four liter beaker was used). The yellow color was discharged in the process. The mix was stirred an additional 30 minutes and the white solid filtered, washed with water and dried at 60°C. Yield of crude product was 264 g. The crude produce decomposed at 220°C. The material was purified by solution in dimethyl formamide, filtering off some insoluble product and diluting the filtrate with water. There was recovered 177 g. of p,p'-oxybis(benzene sulfonyl semicarbazide), dec. 222°C.

EXAMPLE XI

Preparation of 4,4'-Biphenylenebis(sulfonyl semicarbazide)

175.5 g. (0.5 mole) of 4,4'-biphenylenebis(sulfonyl chloride) was converted to 4,4'-biphenylenebis(sodium sulfinate) by a process similar to that describe for p,p'-oxybis(sodium benzene sulfinate) in Example X using 126 g. (1.0 mole) of sodium sulfite and 80 g. (2.0 moles) of sodium hydroxide in 500 ml. water. This solution was added over 10 minutes to a suspension of 116 g. (1.0 mole) of azodicarbonamide in 1500 ml. water. The mixture was stirred for 40 minutes and the resulting white product 4,4'-biphenylenebis(sulfonyl semicarbazide) filtered off, washed and dried. Yield, 227 g. The material decomposed at 270°C.

EXAMPLE XII

Preparation of meta benzenebis(sulfonyl semicarbazide)

In a manner similar to that of Example, VII 137.5 g. (0.5 mole) of meta benzene disulfonyl chloride was reacted with 126 grams (1.0 mole) of sodium sulfite (in 1000 ml. water) and 80 g. (2.0 moles) of sodium hydroxide (in 500 ml. water). To the resulting solution containing disodium meta benzene disulfinate was added 116 g. of azodicarbonamide. There was recovered 34 grams of crude meta benzenebis(sulfonyl semicarbazide). This material was treated with concentrated ammonia, filtered and the filtrate acidified. The resulting precipitate was washed and dried. Yield, 29 g. which decomposed in the 175°–205°C. range. The product was washed well with hot acetonitrile whereupon 26 g. of product was obtained. which decomposed at 218°C.

| Analysis | % N | % S |
| --- | --- | --- |
| Calculated for metabenzenebis-(sulfonyl semicarbazide) | 23.8 | 18.18 |
| Found | 22.75 | 17.98 |

EXAMPLE XIII

Preparation of meta xylenebis(sulfonyl semicarbazide); also called 1,3-dimethylphenyl-2,4-bis(sulfonyl semicarbazide).

In the way previously described, 151.5 g. (0.5 mole) of meta-xylenebis(sulfonyl chloride) was reacted with 126 g. (1.0 mole) of sodium sulfite (in 1000 ml. water), and 80 g. (2.0 moles) of sodium hydroxide (in 500 ml. water). The resulting disodium meta xylenebis (sulfinate) solution was treated with 116 g. (1.0 mole) azodicarbonamide. After decolorization of the azodicarbonamide was complete the white product was filtered off, washed well with water and dried. Yield, 170 g., dec. 235°–240°C. This product was dissolved in concentrated ammonium hydroxide, filtered from a small amount of insoluble material and the filtrate treated with acid. The resulting precipitate, after washing and drying, weighed 157 g.; dec. 263°C.

| Analysis | % C | % H | % N | % S |
| --- | --- | --- | --- | --- |
| Calculated: | 31.57 | 4.21 | 22.1 | 16.44 |
| Found: | 31.19 | 4.07 | 21.06 | 15.55 |

EXAMPLE XIV

Preparation of ethane sulfonyl semicarbazide

Using the procedure described, 128.5 g. (1.0 mole) of ethane sulfonyl chloride was treated with 126 g. (1.0 mole) of sodium sulfite (in 1,000 ml. water) and 80 g. (2.0 moles) of sodium hydroxide (in 500 ml. water). To the resulting solution of sodium ethane sulfinate was added 116 g. (1.0 mole) of azodicarbonamide. All passed into solution and the color of the azodicarbonamide was discharged. The solution was carefully evaporated to dryness and the resulting product was treated with ethanol. Some insoluble material was filtered off. Evaporation of the ethanol left 66 g. of product melting at 87°–129°C. Recrystallization from methanol gave 39 g. of material melting at 145°–150°C.

| Analysis | % C | % H | % N | % S |
| --- | --- | --- | --- | --- |
| Calculated: | 21.56 | 5.39 | 25.15 | 19.16 |
| Found: | 20.81 | 5.48 | 23.82 | 19.20 |

EXAMPLE XV

Preparation of butane-1,4-bis(sulfonyl semicarbazide)

Using the procedure described, 127.5 g. (0.5 mole) of butane-1,4-disulfonyl chloride was reacted with 126 g. (1.0 mole) of sodium sulfite (in 1000 ml. of water) and 80 g. (2.0 mole) of sodium hydroxide (in 500 ml. water). To the resulting solution of disodium butane-1,4-disulfinate was added 116 g. (1.0 mole) of azodicarbonamide. The resulting white solid was filtered off and washed and dried. Yield, 143 g. (86.1% of theory). Dec. 260°C.

This material was taken up in ammonium hydroxide, filtered and acified. The precipitate, after washing and drying, weighed 136 g. and decomposed at 261°C.

| Analysis | % C | % H | % N | % S |
| --- | --- | --- | --- | --- |
| Calculated: | 21.69 | 4.82 | 25.30 | 19.28 |
| Found: | 20.96 | 4.85 | 24.15 | 19.15 |

EXAMPLE XVI

Preparation of naphthalene-1,5-bis(sulfonyl semicarbazide)

As described in previous example, 162.5 g. (0.5 mole) of naphthalene-1,5-bis(sulfonyl chloride) was treated with 126 g. (1.0 mole) sodium sulfite (in 1,000 ml. water) and 80 g. (2.0 mole) sodium hydroxide (in 500 ml. water). To this solution of disodium napthalene-1,5-bis(sulfinate) was added 116 g. (1.0 mole) of azodicarbonamide. There resulted 145 g. of product (72.1% of theory) which decomposed at 255°C. Purification by solution in ammonium hydroxide and reprecipitation with acid gave 138 g. of material which decomposed at 258°C.

| Analysis | % C | % H | % N | % S |
| --- | --- | --- | --- | --- |
| Calculated: | 35.82 | 3.48 | 20.9 | 15.92 |
| Found: | 35.45 | 3.42 | 18.89 | 15.92 |

EXAMPLE XVII

Preparation of p-chlorobenzene sulfonyl semicarbazide

Following the procedure described, 211 g. (1.0 mole) of p-chlorobenzene sulfonyl chloride was reacted with 126 g. (1.0 mole) of sodium sulfite (in 1,000 ml. water) and 80 g. (2.0 moles) of sodium hydroxide (in 500 ml. water). To the resulting sodium p-chlorobenezene sulfinate solution was added 116 g. (1.0 mole) of azodicarbonamide. The solid material dissolved as the mixture was stirred and the yellow color was discharged. The solution was evaporated down to 1,800 ml. and the resulting precipitate was filtered off. The substance was dissolved in ammonium hydroxide, filtered, and reprecipitated with dilute sulfuric acid. There was recovered 10 g. of product which decomposed at 228°C.

| Analysis | % C | % H | % N | % S |
| --- | --- | --- | --- | --- |
| Calculated for p-chlorobenzene sulfonyl semicarbazide: | 33.66 | 3.20 | 16.83 | 12.82 |
| Found | 33.42 | 3.17 | 16.31 | 12.90 |

EXAMPLE XVIII

The ammonium salt of p-toluene sulfinic acid was prepared by adding 7.0cc concentrated ammonium hydroxide (0.1 mole) to 15.6 g. (0.1 mole) p-toluene sulfinic acid in 200 cc of water. The mixture was stirred until all passed into solution. Then 11.6 g. of azodicarbonamide (0.1 mole) was added and the mixture stirred for 70 minutes. The color was mostly discharged during the first ten minutes. The white product was filtered off, washed with water and dried. Yield, 21.5 g. of p-toluene sulfonyl semicarbazide melted at 229°C. (dec.). Acidification of the filtrate gave bubbles of $CO_2$.

I claim:

1. A process of preparing an organic sulfonyl semicarbazide of the formula

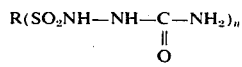

where R is an alkyl radical having from 1 to 18 carbon atoms, an alkylene radical having from 2 to 18 carbon atoms, an aryl or arylene radical having from 6 to 12 carbon atoms, an alkaryl or alkarylene radical having from 7 to 18 carbon atoms, an aralkyl or aralkylene radical having from 7 to 8 carbon atoms, a cycloalkyl or cycloalkylene radical having from 5 to 8 carbon atoms, or a group —R'—X—R''— where R' and R'' are alkylene radicals having 2 to 4 carbon atoms or phenylene, X is —O—, —S—, —SO—, —$SO_2$—, —NH—, or —CO—, and n is 1 or 2, which comprises contacting a salt of a sulfinic acid having the formula $$[R(SO_2)_n]_mA$$

where R and n are previously defined, A is ammonium or a metal which forms a salt with sulfinic acid selected from the group consisting of lithium, sodium, potassium, magnesium, barium, calcium, zinc, cadmium and aluminum, and $m$ is ½, 1 or 2, with azodicarbonamide in the presence of water.

2. A process of preparing an organic sulfonyl semicarbazide of the formula

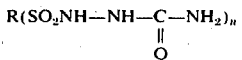

where R is an alkyl radical having from 1 to 18 carbon atoms, an alkylene radical having from 2 to 18 carbon atoms, an aryl or arylene radical having from 6 to 12 carbon atoms, an alkaryl or alkarylene radical having from 7 to 18 carbon atoms, an aralkyl or aralkylene radical having from 7 to 8 carbon atoms, a cycloalkyl or cyloalkylene radical having from 5 to 8 carbon atoms, or a group —R'—X—R''—where R' and R'' are alkylene radicals having 2 to 4 carbon atoms or phenylene, X is —O—, —S—, —SO—, —$SO_2$—, —NH—, or —CO—, and n is 1 or 2, which comprises contacting a salt of a sulfinic acid having the formula $$[R(SO_2)_n]_mA$$

where R and n are as previously defined, A is ammonium or a metal which forms a salt with sulfinic acid selected from the group consisting of lithium, sodium, potassium, magnesium, barium, calcium, zinc, cadmium and aluminum, and $m$ is ½, 1 or 2, with azodicarbonamide in the presence of water, whereby the said organic sulfonyl semicarbazide forms as a precipitate and thereafter recovering the said organic sulfonyl semicarbazide from the reaction mixture by separating the resulting precipitate of organic sulfonyl semicarbazide from the reaction mixture.

3. A process for preparing an organic sulfonyl semicarbazide of the formula

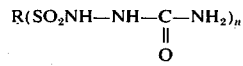

where R is alkyl having 1 to 8 carbon atoms, alkylene having 2 to 8 carbon atoms, phenyl, phenyl substituted with 1 or 2 substituents selected from 1 to 4 carbon atom alkyl and halogen, biphenyl, naphthyl, phenylene, phenylene substituted with 1 or 2 substituents selected from 1 to 4 carbon atom alkyl and halogen, biphenylene, napthylene, oxybisphenyl, thiobisphenyl, sulfinylbisphenyl, sulfonylbisphenyl, iminobisphenyl and carbonylbisphenyl, and n is 1 or 2, which comprises contacting a salt of a sulfuric acid having the formula $$[R(SO_2)_n]_mA$$

where R and n are as previously defined, A is ammonium or a metal which forms a salt with sulfinic acid selected from the group consisting of lithium, sodium, potassium, magnesium, barium, calcium, zinc, cadmium and aluminum, and $m$ is ½, 1 or 2, with azodicarbonamide in the presence of water, whereby the said organic sulfonyl semicarbazide forms as a precipitate and thereafter recovering the said organic sulfonyl semicarbazide from the reaction mixture by separating the resulting precipitate of organic sulfonyl semicarbazide from the reaction mixture.

4. A process as in claim 3 in which R is phenyl or tolyl.

5. A process as in claim 3 in which R is phenylene.

6. A process as in claim 3 in which R is p,p'-oxybis(phenyl).

7. A process as in claim 3 in which R is p,p'-biphenylene.

8. A process as in claim 3 in which A is sodium.

9. A process as in claim 3 in which A is ammonium.

10. A process as in claim 3 in which the said salt is sodium p-toluenesulfinate.

11. A process as in claim 3 in which the said salt is ammonium p-toluenesulfinate.

12. A process as in claim 3 in which the said salt is sodium benzenesulfinate.

13. A process as in claim 3 in which the said salt is ammonium benzenesulfinate.

14. A process as in claim 3 in which the said salt is 4,4'-biphenylenebis(sodium sulfinate).

15. A process as in claim 3 in which the said salt is 4,4'-biphenylenebis(ammonium sulfinate).

16. A process as in claim 3 in which the said salt is p,p'-oxybis(sodium benzenesulfinate).

17. A process as in claim 3 in which the said salt is p,p'-oxybis(ammonium benzenesulfinate).

18. A process as in claim 3 in which the said salt is m-xylylenebis(sodium sulfinate).

19. A process as in claim 3 in which the said salt is m-xylylenebis(ammonium sulfinate).

* * * * *